United States Patent
Post et al.

(10) Patent No.: US 9,253,093 B2
(45) Date of Patent: Feb. 2, 2016

(54) METHOD FOR PROCESSING DATA PACKETS IN FLOW-AWARE NETWORK NODES

(75) Inventors: Georg Post, Nozay (FR); Ludovic Noirie, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 979 days.

(21) Appl. No.: 13/387,583

(22) PCT Filed: Sep. 30, 2010

(86) PCT No.: PCT/EP2010/064535
§ 371 (c)(1),
(2), (4) Date: Aug. 6, 2012

(87) PCT Pub. No.: WO2011/039300
PCT Pub. Date: Apr. 7, 2011

(65) Prior Publication Data
US 2012/0314709 A1    Dec. 13, 2012

(30) Foreign Application Priority Data
Sep. 30, 2009   (EP) .................................... 09290749

(51) Int. Cl.
*H04L 12/851* (2013.01)
*H04L 12/801* (2013.01)
*G06F 12/08* (2006.01)

(52) U.S. Cl.
CPC ............ *H04L 47/10* (2013.01); *G06F 12/0802* (2013.01); *H04L 47/2483* (2013.01)

(58) Field of Classification Search
CPC ..... G06F 12/0802; G06F 12/06; G06F 12/08; H04L 49/90; H04L 47/10; H04L 47/2483; H04L 47/621; H04L 49/254
See application file for complete search history.

(56) References Cited

U.S. PATENT DOCUMENTS

| 2003/0061269 | A1* | 3/2003 | Hathaway et al. ............ 709/202 |
| 2005/0204091 | A1* | 9/2005 | Kilbuck et al. ............... 711/103 |
| 2006/0090039 | A1 | 4/2006 | Jain et al. |
| 2009/0043972 | A1* | 2/2009 | Kamiko et al. ............... 711/154 |
| 2009/0138673 | A1* | 5/2009 | Wilson et al. ................. 711/211 |
| 2010/0162265 | A1* | 6/2010 | Heddes ......................... 719/314 |
| 2012/0017039 | A1* | 1/2012 | Margetts ....................... 711/105 |

OTHER PUBLICATIONS

Schuehler D V et al: "Architecture for a Hardware Based, TCP/IP Content Scanning System", High Performance Interconnects, 2003. 2003, Piscataway, NJ, USA, IEEE, Aug. 20, 2003, pp. 89-94, XP010657979, ISBN: 978-0-7695-2012-4 the whole document.

(Continued)

*Primary Examiner* — Raj Jain
(74) *Attorney, Agent, or Firm* — Harness, Dickey & Pierce, P.L.C.

(57) ABSTRACT

A method and apparatus for processing data packets in flow-aware network nodes is disclosed for storing flow data without altering transmission data throughput for a limited cost. The method and apparatus for processing data packets in flow-aware network nodes includes alternate usage of a fast access internal memory and a slower speed access external memory which provides low latency yet comprehensive flow-awareness. The method for processing data packets in flow-aware network nodes is particularly useful for overcoming requiring extensive usage of fast access memory of flow-aware network nodes known in the art.

16 Claims, 4 Drawing Sheets

(56) References Cited

OTHER PUBLICATIONS

Smith A J: "Cache Memories", ACM Transactions on Database Systems, ACM, New York, NY, US, vol. 14, No. 3, Sep. 1, 1982, pp. 473-530, XP000284855, ISSN: 0362-5915 abstract Introduction; pp. 473-479 2.1 Cache Fetch Algorithm—2.5 Write-Through versus Copy-Back; pp. 481-502 2.15 Pipelining; p. 518.

Jun Xu et al: "A novel cache architectureto support layer-four packet classification at memory access speeds", Infocom 2000. Nineteenth Annual Joint Conference of the IEEE Computer and Communications Societies. Proceedings.IEEE Tel Aviv, Isreal Mar. 26-30, 2000, Piscataway, NJ, USA, IEEE, US, vol. 3, Mar. 26, 2000, pp. 1445-1454, XP010376081, ISBN: 978-0-7803-5880-5 the whole document.

Bailer M L et al; "Pathfinder: A Pattern-Based Packet Classifier", 4th Symposium on Operating Systems Design and Implementation. Oct. 23-25, 200, San Diego, CA, Usenix Association, US, Nov. 14, 1994, pp. 115-123, XP002913602, the whole document.

\* cited by examiner

METHOD FOR PROCESSING DATA PACKETS IN FLOW-AWARE NETWORK NODES

BACKGROUND OF THE INVENTION

The present invention relates to the field of communication networks and more precisely of data packet processing in packet routers.

Data packet routers are located in the network nodes. In the case of flow aware packet networks, said routers and particularly the ones corresponding to nodes located at the edges of the network have to keep a memory of the state information of the flows entering the system. Such recording has to be achieved for all the flows received by the network nodes. In the case of high speed channels (≥10 Gb/s), said flow state information associated with flow IDs needs to be available as fast as possible to prevent delays during packet processing. Besides, the flow size may vary from a "mouse" flow comprising a few (a dozen for example) packets to "elephant" flows comprising hundreds of packets. The memory capacity needs therefore to be large enough to cover any situation.

Thus, flow-information storage needs to combine large capacity memory with reduced latency access of the stored data such that transmitted packets can be processed according to the data bitrate of the transmission. Moreover, the cost of such memory has to remain as low as possible to be widely used.

SUMMARY OF THE INVENTION

It is therefore an object of the present invention to provide equipment to store flow data without altering transmission data throughput for a limited cost.

Thus, the present invention refers to a method for managing the storage of flow data in a packet processing equipment wherein said equipment processes a packet stream that is a random aggregate of a large number of distinct flows of packets and comprises a fast access internal memory and a slower access external memory and wherein said method comprises the following steps:

receiving a data packet at the input of the packet processing equipment, extracting a flow ID from the data packet header and mapping it to an address at which corresponding flow data are stored in the slower access external memory, determining if said received data packet corresponds to a new flow, if said received data packet is the first of its flow, creating a new flow data record, if at least one other packet of the flow has been received in the packet processing equipment, determining if the flow data corresponding to said received packet is available in the fast access internal memory, if the corresponding flow data is available in the fast access internal memory, locating said flow data, if no corresponding flow data is available in the fast access internal memory, retrieving said corresponding flow data from the slower access external memory and storing them in the fast access internal memory, achieving packet processing using corresponding flow data from the fast access internal memory, when no more packet of a given flow are located in the packet processing equipment, updating corresponding flow data in the slower access external memory from the flow data in the fast internal memory, securing corresponding flow data update.

According to another aspect of the invention, the delay between the starting time of the step of extracting a flow ID and mapping it to the corresponding address and the starting time of the step of packet processing corresponds to a duration larger than the time of mapping a flow ID to the corresponding address plus the access latency of the slower access external memory.

According to a further aspect of the invention, the step of securing corresponding flow data update is achieved by holding the flow data in the fast access internal memory for a delay larger than the write-access latency of the slower access external memory after the ending time of the step of packet processing.

According to an additional aspect of the invention, the fast access internal memory corresponds to an on-chip static random access memory (SRAM) and the slower access external memory corresponds to an off-chip dynamic random access memory (DRAM).

According to another aspect of the invention, said method comprises an additional step corresponding to the freeing of the memory space of the fast access internal memory of the corresponding flow data, said additional step being achieved after the step of securing corresponding flow data update in order to ensure that up-to-date flow data will be used if a packet of said flow is received in the packet processing equipment.

According to a further aspect of the invention, the capacity of the fast access internal memory corresponds to the required capacity for recording flow data corresponding to the maximal possible number of packets in transit in the equipment.

According to an additional aspect of the invention, the step of extracting a flow ID and a memory address from the data packet header is achieved by organized data repositories.

According to another aspect of the invention, the organized data repositories are routing lookup tables.

According to a further aspect of the invention, the packet processing equipment comprises a packet pipeline and at least one process is applied sequentially on the packets transmitted in said packet pipeline.

According to an additional aspect of the invention, the fast access internal memory is partitioned into separately addressable sectors and is distributed in function of the different concurrent processes.

According to another embodiment of the invention, a fraction of the time slots of received packets, for accessing the slower access external memory, are reserved for internal service packets.

According to a further embodiment of the invention, at the reception of a data packet at the input of the packet processing equipment, the packet payload is separated from the packet header, said packet payload being stored in a memory and the step of achieving packet processing using corresponding flow data from the fast access internal memory is applied to the packet header, packet payload and packet header being joined together after packet header processing.

The present invention also refers to a packet processing equipment comprising a fast access internal memory and a slower access external memory wherein it also comprises means for:

receiving a data packet at the input of the packet processing equipment, extracting a flow ID and a memory address from the data packet header, saving flow data corresponding to the extracted flow ID and address in the slower access external memory, retrieving said flow data from the slower access external memory and storing them in the fast access internal memory, achieving packet processing by using corresponding flow data from the fast access internal memory, updating corresponding flow data of the slower access external memory when no more packet of a flow are located in the packet processing equipment, holding corresponding flow data during a predetermined time in the fast access internal memory.

According to another aspect of the invention, the step of achieving packet processing comprises the modification of the flow data in the fast access internal memory according to the packet processing.

According to a further aspect of the invention, the fast access internal memory corresponds to an on-chip static random access memory (SRAM) and the slower access external memory corresponds to an off-chip dynamic random access memory (DRAM).

According to an additional aspect of the invention, said means are also configured for freeing the memory space of the fast access internal memory of the corresponding flow data.

DETAILED DESCRIPTION OF THE INVENTION

As used herein, the term "flow" refers to a plurality of data packets having common properties and in particular, a common flow ID.

As used herein, the term "flow ID" refers to an identification of a data flow, said identification comprising features or factors representative of the corresponding data flow.

As used herein, the term "access latency" refers to the time required between the triggering of a read request in a core device and the effective availability of the data in the core device or between a write request and the effective update of storage in the memory device.

Figure 1:
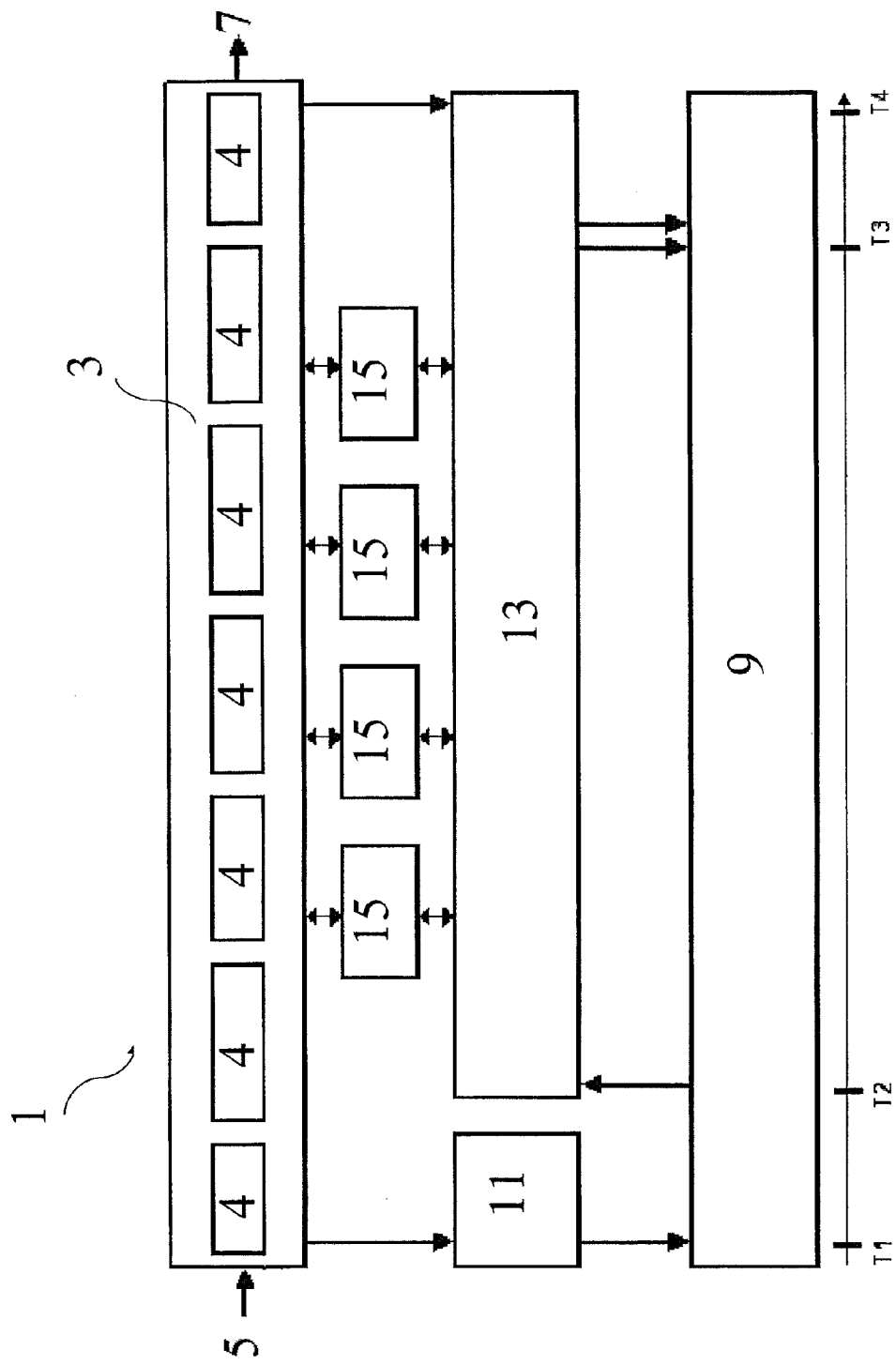
FIG. 1 is a diagram of a possible embodiment of the packet processing equipment.

FIG. 1 represents an example of embodiment of a packet processing equipment 1 according to the present invention. Said equipment comprises a packet processor unit 3 which can be for example a packet pipeline. Packets 4 are received at the input 5, then put in transit as a packet stream along the packet processor unit 3 to the output 7 of said packet processor unit 3.

Figure 2:
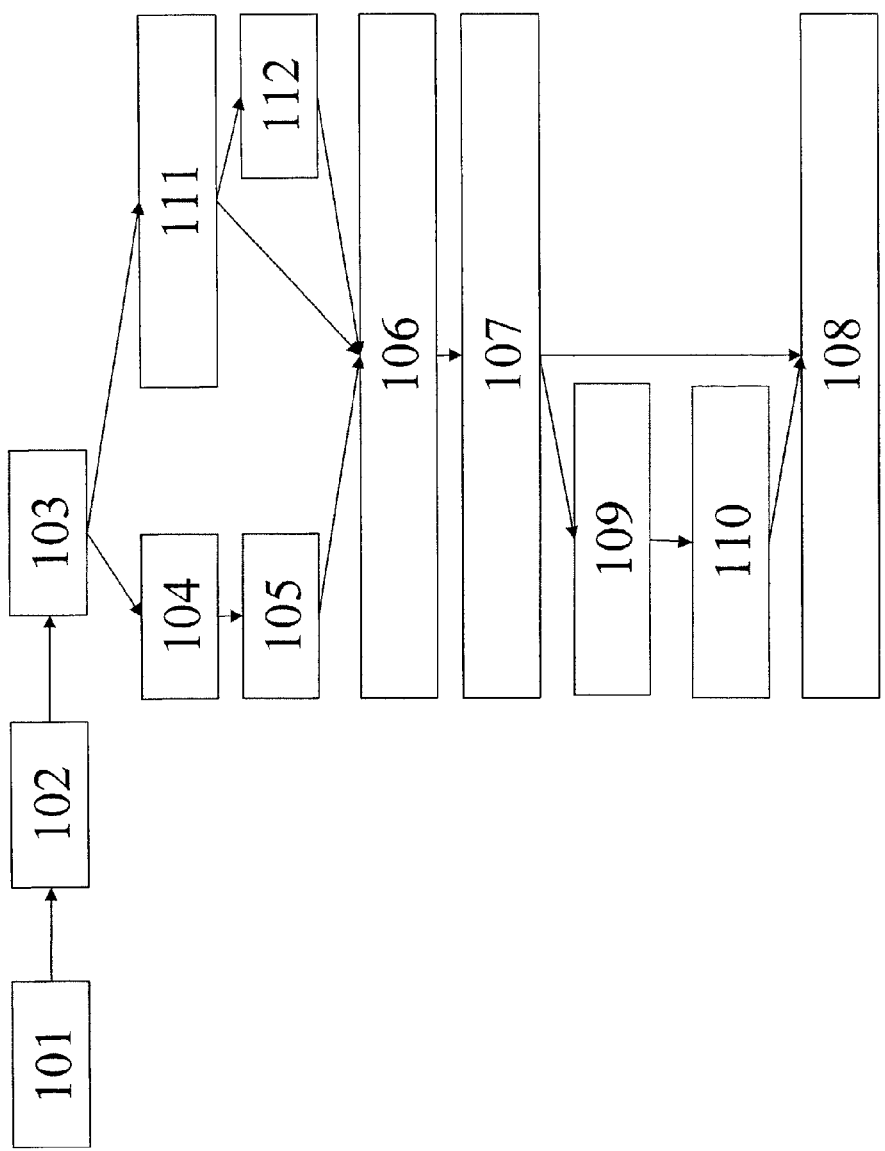
FIG. 2 is a synoptic diagram representing the different steps of an embodiment of the present invention.

FIG. 2 represents the different steps of an embodiment of the present invention based on the equipment described in FIG. 1.

At the reception at the input 5 of the packet processor unit (step 101), packet headers are read in order to extract the flow ID corresponding to the received packet (step 102). Indeed, packets 4 are received randomly from a plurality of flows, said flows having different origins and destinations. Moreover, the different flows may have different sizes (number of packets). Thus, the flow ID of the received packet is compared with the flow IDs for which there are flow data already recorded in an external slow access memory 9. Said memory can be for example an off-chip dynamic random access memory (DRAM).

It has to be noted that for a DRAM, the access latency does not imply slow data transmission. Indeed the data transmission itself can be achieved by burst and can therefore reach high data rates.

Said comparison of flow IDs is achieved in an organized data repository 11, for example, a routing lookup table or a ternary content addressable memory or multiple hash tables. It has also to be noted that Bloom filters can be used in said organized data repository 11. As a result of matching a known flow ID, the flow ID is mapped to an address at which the corresponding flow data are stored in the external slow access memory 9.

Furthermore, such comparison allows determining if the received packet is the first of a new flow (step 103). In such case, a new flow data record is created in the slow access external memory 9 in order to save the data comprised in the flow ID (step 104) and all subsequent data pertaining to the same flow.

An aspect of the invention is the combination of a fast access internal memory 13, for example an on-chip static random access memory (SRAM) with the slower access external memory 9. Such combination allows providing high capacity memory and reduced access latencies while limiting the cost of said memory. Thus, in step 104 a free memory space (also called free cache line of memory) of the fast access internal memory 13 is assigned to the packet.

In order to reduce the size (and therefore the cost) of the fast access internal memory 13, only the flow data concerning the packets in transit in the packet processor unit 3 are placed in the fast access internal memory 13. The capacity of the fast access internal memory 13 has therefore to be large enough to handle the worst case in term of memory requirement which corresponds to a packet stream having only single packets belonging to different flows along the entire packet processor unit 3. In such case, a memory space is required for any of the packets 4 in transit.

When the first packet of a flow is received at the input of the packet processing equipment 1, the corresponding initial flow data are saved in the slower access external memory 9; when a second or later packet of a flow is received, said flow data are retrieved from the external memory. In both cases, said data are copied into the assigned free memory space of the fast access internal memory 13 (step 105).

Then, during its transit in the packet processor unit 3, the packet undergoes different processes 15 (step 106). Said processes 15 may be for example a header modification, a filtering process such as a shaping, a modification of the flow statistics (such as a packet or bit counter incrementation), an update of the congestion bit or a flow bitrate mean determination.

Thanks to the implementation described in FIG. 1, flow data required for the different processes are available in the fast access internal memory 13 so that latencies to access said data are reduced and do not prevent high bitrate transmission of the packets.

Besides, the different processes modify the flow data so that a fast access of the memory is also needed for updating the modified values of the flow data. When a packet of the flow reaches the output of the packet processor unit, different cases may occur in function of the presence or the absence of packets of the same flow in transit in the packet processor unit 3 which is determined in step 107.

If another packet of the same flow is in transit in the packet processor unit 3, then said new packet in transit will use the same flow data from the fast access internal memory 13 so that flow data remain in said fast access internal memory 13. The packet process is then over (step 108). If no other packet is in transit in the packet processor unit 3, then up-to-date flow data are copied into the slower access external memory 9 (step 109) and eventually the memory space corresponding to this flow data in the fast access internal memory is freed by erasing said data (step 110), said memory may then be reused for another packet.

Thus, at the reception at the input 5 of the packet processor unit 3 of a packet belonging to a flow having a previous packet transmitted through said packet processor unit 3, no new flow data record needs to be created as said flow data already exists. However, a check is needed if a previous packet of the flow is still in transit in the packet processor unit 3 (step 111).

Two distinct cases may happen. If the previous packet of the flow is still in transit in the packet processor unit 3, the flow data are still available in the fast access internal memory 13 and will be used for achieving processes on the newly received packet. In the case, the next step is the step 106.

Otherwise, if the previous packet of the flow has already left the output 7 of the packet processor unit 3 which means that the corresponding flow data have been erased from the fast access internal memory 13, corresponding flow data recorded in the slower access external memory 9 are copied into the fast access internal memory 13 (step 112).

Moreover, at the end of the flow, the slower access external memory 9 is also freed by deleting the corresponding flow data. The end of the flow can be determined for example by setting a maximum time between two packets of the same flow (for example 2 seconds). Thus after the timer (of 2 seconds) has elapsed, the flow is considered as over and corresponding data are erased from the memory 9.

Besides, the fast access internal memory 13 can be partitioned into separately addressable sectors such that a given sector is used for a given process. In consequence, one addressable sector corresponds to one process.

According to another aspect of the invention, a timing has to be respected between steps described previously in order to ensure the correctness of the packet processing. A time axis is represented at the bottom of FIG. 1. Time T1 corresponds to the reception of a packet at the input of the packet processor unit 3. Time T2 corresponds to the completion of the data transfer or data copy from the slower access external memory 9 towards the fast access internal memory 13.

In order to ensure that the flow data have been transferred to the fast access internal memory 13, the delay between T1 and T2 has to be equal or larger than the latency of the access to the external memory 9.

Time T3 corresponds to the beginning of the transfer of the up-to-date flow data from the fast access internal memory 13 to the slower access external memory 9. Time T4 corresponds to the erasing of the flow data in the fast access internal memory 13.

In order to secure the data storage and insure the use of up-to-date data, the delay between T3 and T4 has to be equal or larger than the latency of the write-access to the external memory 9, so that the storage of up-to-date data is complete at time T4. Indeed, such delay allows, in case of arrival of a new packet of the flow at the input 5 of the packet processor unit 3 during the delay between T3 and T4 of the preceding packet to still have up-to-date data in the fast access internal memory 13. If the arrival of a new packet of the flow at the input 5 of the packet processor unit 3 occurs after time T4 of the preceding packet of the same flow, data recorded in the slower access external memory 9 are up-to-date and will be retrieved. If the arrival occurs between times T3 and T4, the flow data still present in fast internal memory is used, as the copy of the flow data into slow external memory is not yet complete.

According to another aspect of the invention, in order to insure proper functioning of the packet process equipments, service packets are used and are transmitted in the packet processor unit 3 among the data packets.

Figure 3:
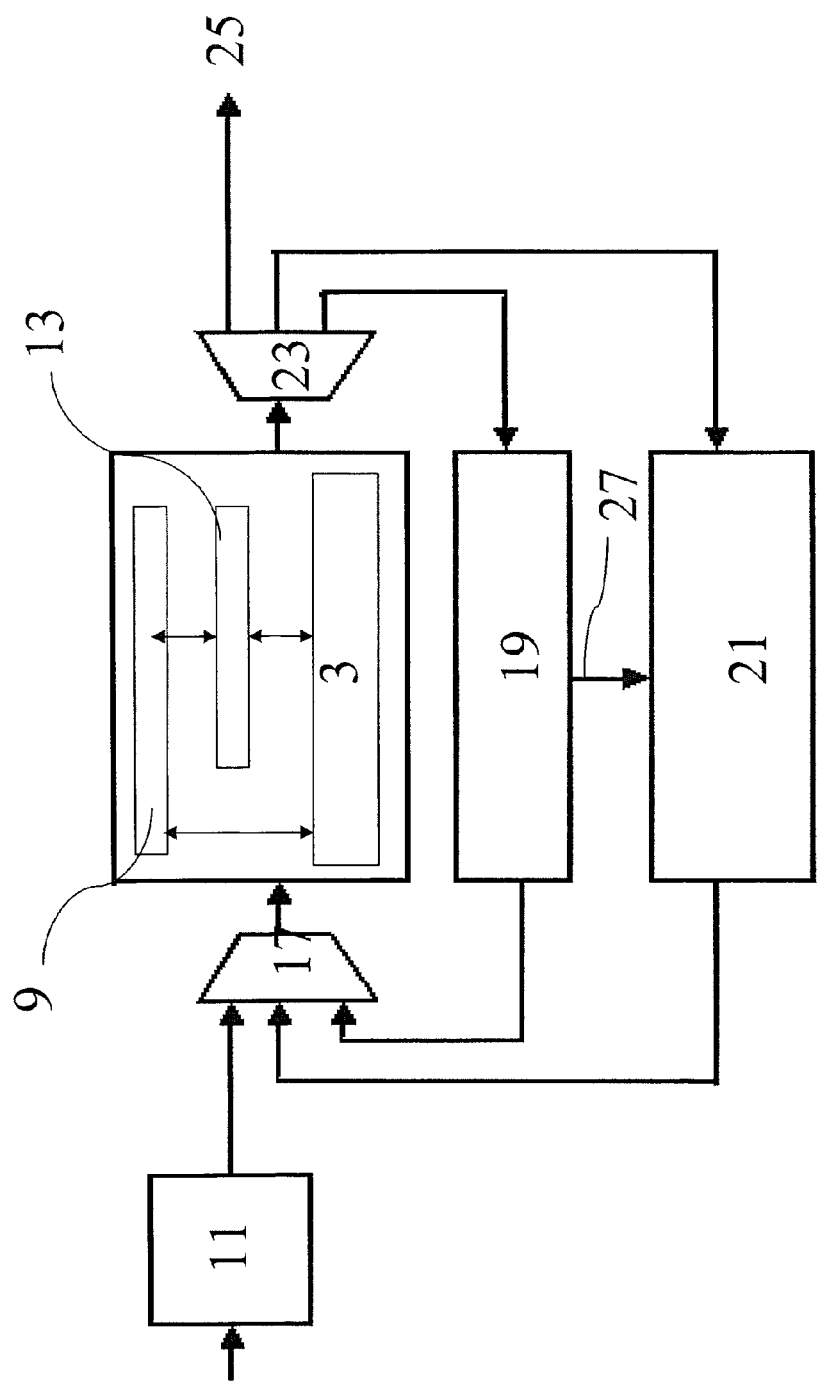
FIG. 3 is a diagram representing the implementation of equipment required for managing service packets.

FIG. 3 represents the organization of these service packets. After analysis of the flow ID by the organized data repository 11, data packets with their flow ID are transmitted to the input of a multiplexer 17. The other inputs of the multiplexer are connected to a database clean-up generator 19 providing clean-up service packets and to a node control, management and knowledge-building unit 21 providing control/management service packets.

Thus, service packets are inserted in the data packet stream. This can be achieved for example by modifying the time slots. For example, with a 40 ns access instead of 50 ns, one additional time slot called internal service time slot can be added every four time slots (data packet time slots). Said internal service packets control the deletion of obsolete data in the memories and databases as well as exchange control, monitoring or management information with the other equipments of the node.

At the output of the packet processor unit 3, packets are transmitted to a demultiplexer 23 wherein data packets are sent towards their destination 25 whereas service response packets are sent back to the database clean-up generator 19 in the case of clean-up service packets or to the node control/management unit 21 for the control/management packets, said packets carrying, for example, statistics information about the different flows that have been processed or created or deleted.

Moreover, statistics information are transmitted from the database clean-up generator to the control/management unit 21 (arrow 27).

Besides, it has to be noted that if it is required for correct functioning or in case of idle periods in the packet processor unit 3 and during the delay of large packets whose payload does not need any processing, the "unused" data packet time slots can be transformed into internal service time slots.

According to another embodiment of the present invention, only packet headers are processed while packet payloads remain unchanged which allows to accelerate processing when appropriate.

Figure 4:
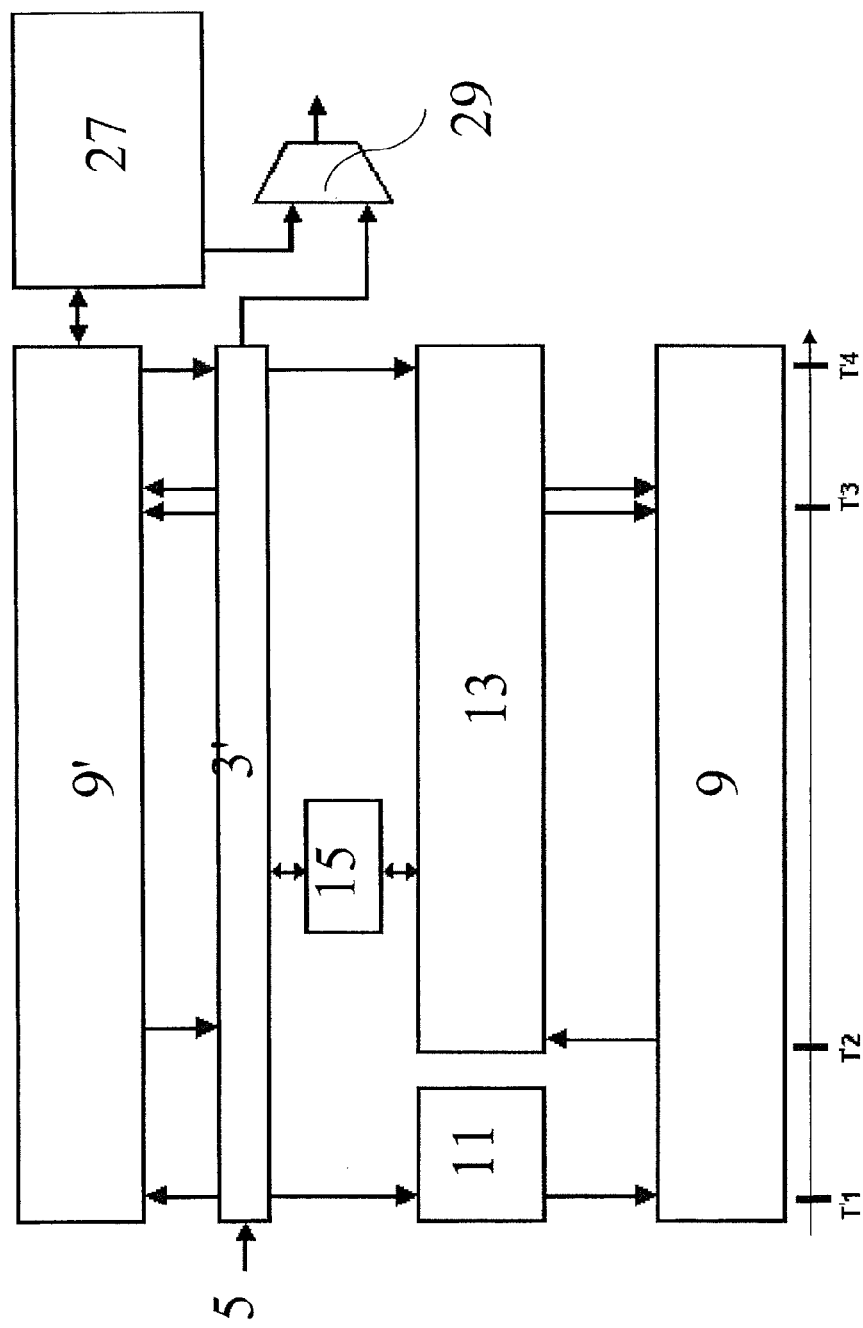
FIG. 4 is a diagram of a possible embodiment of a packet header processing equipment.

As shown in FIG. 4, at time T'1, a packet is received. Only the header part is transmitted to the packet header processor unit 3' while the packet payload is stored in a queue memory 9' which is similar to a slower access external memory 9. As previously, a flow ID is extracted from the header and mapped to an address on the slower access external memory 9. At time T'2, on one side, flow data are transferred from the slower access external memory 9 to the fast access internal memory 13 while, on the other side, a storage pointer of the memory space where the payload is stored is sent to the packet header processing unit 3'. Processes 15 are then applied to the packet headers. At time T'3, on one side up-to-date flow data are sent from the fast access internal memory 13 to the slower access external memory 9 while, on the other side, the processor sends back the pointer and the processed packet header to the queue memory 9'. Depending on the state of the packet, either the full packet content is finally recovered from queue memory at time T'4 or the header is buffered with the payload for later forwarding. Said buffering is managed by a queue and traffic manager 27. Packets which do not need any queueing can be sent immediately to the output through a cutthrough multiplexer 29; otherwise the packet forwarding schedule is managed by the queue and traffic manager 27.

The invention claimed is:

1. A method of managing storage of flow data in a packet processing equipment, said including a fast access internal memory and a slower access external memory and configured to process a packet stream that is a random aggregate of a plurality of distinct flows of packets, said method comprising:
    receiving a data packet at an input of the packet processing equipment,
    extracting a flow ID from a data packet header of the data packet and mapping the flow ID to an address at which corresponding flow data are stored in the slower access external memory;
    determining if said received data packet corresponds to a new flow, if said received data packet is a first packet of the flow,
    creating a new flow data record in the slower access external memory; if at least one other data packet of the flow has been received in the packet processing equipment,
        determining if a flow data corresponding to said received data packet is available in the fast access internal memory; if the corresponding flow data to said second data packet is available in the fast access internal memory,
            locating said flow data;
        if no corresponding flow data to said second data is available in the fast access internal memory,
            retrieving said corresponding flow data from the slower access external memory and storing them in the fast access internal memory;
    achieving packet processing using the corresponding flow data from the fast access internal memory, when no more packet of the flow are located in the packet processing equipment;
    updating the corresponding flow data in the slower access external memory from the flow data in the fast internal memory; and
    securing the corresponding flow data update.

2. The method of managing the storage of the flow data in a packet processing equipment in accordance with claim 1, wherein a delay between the starting time of extracting the flow ID and mapping it to the corresponding address and the starting time of the packet processing corresponds to a duration larger than the time of mapping the flow ID to the corresponding address plus an access latency of the slower access external memory.

3. The method of managing the storage of flow data in a packet processing equipment in accordance with claim 1, wherein the securing of corresponding flow data update is achieved by holding the flow data in the fast access internal memory for a delay larger than a write-access latency of the slower access external memory after achieving the packet processing.

4. The method of managing the storage of flow data in a packet processing equipment in accordance with claim 1, wherein the fast access internal memory corresponds to an on-chip static random access memory (SRAM) and the slower access external memory corresponds to an off-chip dynamic random access memory (DRAM).

5. The method of managing the storage of flow data in a packet processing equipment in accordance with claim 1, further comprising:
    freeing the memory space of the fast access internal memory of the corresponding flow data, said memory space being freed after securing the corresponding flow data update in order to ensure the use of up-to-date flow data, if a packet of said flow is received in the packet processing equipment.

6. The method of managing the storage of flow data in a packet processing equipment in accordance with claim 1, wherein a capacity of the fast access internal memory corresponds to a required capacity for recording flow data corresponding to a maximum possible number of packets in transit in the equipment.

7. The method of managing the storage of flow data in a packet processing equipment in accordance with claim 1, wherein the extracting uses organized data repositories.

8. The method of managing the storage of flow data in a packet processing equipment in accordance with claim 7, wherein the organized data repositories are routing lookup tables.

9. The method of managing the storage of the flow data in a packet processing equipment in accordance with claim 1, wherein the packet processing equipment comprises a packet pipeline and wherein at least one process is applied sequentially on the packets transmitted in said packet pipeline.

10. The method of managing the storage of flow data in a packet processing equipment in accordance with claim 1, wherein the fast access internal memory is partitioned into separately addressable sectors and is distributed in function of the different concurrent processes.

11. The method of managing the storage of flow data in a packet processing equipment in accordance with claim 1, wherein a fraction of time slots of the received packets, for accessing the slower access external memory, are reserved for internal service packets.

12. The method of managing the storage of flow data in a packet processing equipment in accordance with claim 1, wherein the packet payload is separated from the packet header, at reception of the data packet at the input, said packet payload being stored in a memory and wherein the packet processing using the corresponding flow data from the fast access internal memory is applied to the packet header, said packet payload and packet header being joined together after packet header processing.

13. A packet processing equipment comprising a fast access internal memory and a slower access external memory, the packet processing equipment configured to:
    receive a data packet at the input of the packet processing equipment,
    extract a flow ID and a memory address from a data packet header of the data packet,
    save flow data corresponding to the extracted flow ID and address in the slower access external memory,
    retrieve said flow data from the slower access external memory and store them in the fast access internal memory,
    achieve packet processing by using corresponding flow data from the fast access internal memory,
    update the corresponding flow data of the slower access external memory when no more packet of the flow are located in the packet processing equipment,
    hold corresponding flow data for a desired time in the fast access internal memory.

14. The packet processing equipment in accordance with claim 13, further configured to achieve packet processing by modifying the flow data in the fast access internal memory.

15. The packet processing equipment in accordance with claim 13, wherein the fast access internal memory corresponds to an on-chip static random access memory (SRAM) and the slower access external memory corresponds to an off-chip dynamic random access memory (DRAM).

16. The packet processing equipment in accordance with claim 13, further configured to free a memory space of the fast access internal memory of the corresponding flow data.

* * * * *